United States Patent [19]
Shtayer et al.

[11] Patent Number: 5,923,658
[45] Date of Patent: Jul. 13, 1999

[54] ATM LINE CARD AND METHOD FOR TRANSFERRING CONNECTION MEMORY DATA

[75] Inventors: Ronen Shtayer; Ron Eliyahu, both of Herzlia, Israel

[73] Assignee: Motorola Inc., Austin, Tex.

[21] Appl. No.: 08/856,835

[22] Filed: May 15, 1997

[30] Foreign Application Priority Data

Jun. 19, 1996 [EP] European Pat. Off. .............. 96109861

[51] Int. Cl.$^6$ ................................. H04L 12/56
[52] U.S. Cl. ........................................... 370/399; 370/465
[58] Field of Search .................................. 370/465, 410, 370/522, 395, 396, 397, 398, 399

[56] References Cited

U.S. PATENT DOCUMENTS 5,812,550 9/1998 Sohn et al. ............................. 370/395
5,848,068 12/1998 Daniel et al. ........................... 370/395

FOREIGN PATENT DOCUMENTS 0703718 8/1995 European Pat. Off. .

OTHER PUBLICATIONS

K.Y. Eng, M.A. Pashan, G.D. Martin and C.R. Crue AT&T Bell Laboratories, "An ATM Cross–Connect System For Broadband Trials and Applications", in 1993 IEEE, pp. 1454–1460.

*Primary Examiner*—Alpus H. Hsu
*Assistant Examiner*—Maikhanh Tran
*Attorney, Agent, or Firm*—Bruce F. Hayden

[57] ABSTRACT

An ATM line card is provided wherein a microprocessor bus is selectively coupled to a memory bus during maintenance time intervals. This allows direct transfer of connection memory data to the microprocessor system of the line card and thus to the RAM of the system. After the transfer is accomplished the busses are decoupled again so that further maintenance work of the connection memory and the transferred data can be done independently. If the access to the connection memory is due to a destructive read operation the corresponding memory locations in the connection memory are reset simultaneous to the transfer of the data which are read out from the DMA of the microprocessor system to the RAM. This results in a dramatic reduction of the time required for maintenance of the ATM system.

8 Claims, 2 Drawing Sheets

5,923,658

ATM LINE CARD AND METHOD FOR TRANSFERRING CONNECTION MEMORY DATA

BACKGROUND OF THE INVENTION

The invention pertains to the field of telecommunications and, more particularly, to a packet switch for a transfer of data in asynchronous mode in a digital transmission network, which can be used notably in an integrated data services network designed for the transmission of data of different origins, at greatly differing throughput rates, the different services being capable of using data throughput rates that vary in a broad range. Such a system is commonly known as the "broad band" ISDN "system".

The asynchronous transfer mode (ATM) has been chosen by standards committees as an underlying transport technology within many broad band integrated services digital network protocol stacks. A description of the standardized ATM telecommunications concept can be found in a publication of the ATM forum entitled "ATM user-network interface specifications", 1993, published by PTR Prentice Hall.

ATM switching systems are required to maintain running counts of the cells that are processed on each virtual connection. ATM switching systems usually also store indications of various events that are detected by processing the cell flow of the virtual connections. The number of virtual connections using a single physical link typically numbers in the tenth of thousands. The invention therefore is aimed to provide an improved ATM line card and method for handling such data like cell counts and event indications which are stored in the connection memory.

SUMMARY OF THE INVENTION

The objects of the invention are solved basically by applying the features laid down in the independent claims. Further preferred embodiments of the invention are given in the dependent claims.

The invention is particularly advantageous in that it allows to process event indications which are stored in the connection memory without interrupting the cell flow. This can be accomplished by processing the incoming cells which are inputted to an individual line card at a rate slightly above the line rate, i.e. the transmission rate on the physical link, and providing a small FIFO to handle the rate differential. In this way "holes" in the cell flow are provided at regular intervals which are used for accessing the event indications which are stored in the connection memory.

The efficiency of the access to the event indications in the connection memory is further enhanced if a direct memory access (DMA) device is used. The invention allows to directly transfer the event indications from the connection memory to the DMA by coupling together the microprocessor bus and the connection memory bus of the line card. After this first transfer is accomplished the buses are decoupled again so that the data are transferred from the DMA to the random access memory (RAM) of the microprocessor system of the line card independently from the connection memory bus.

The time interval needed for this second transfer of data from the DMA to the RAM can be used to reset the event indications in the connection memory at the same time. All this can be done during the same time slot which is provided by the "hole" in the cell flow which is due to the rate differential of the processing speed and the transmission on the physical connection. This way it is guaranteed that the connection memory remains consistent at the end of every maintenance time slot with the contents of the RAM. For example, if a counter is read during a maintenance slot, in most cases it must be cleared during the same maintenance slot or the count will be incorrect. The same principal applies to other event indications.

However, in some applications it is not always required that an event indication is reset in the connection memory after it was read and transferred to the RAM. According to a preferred embodiment of the invention it is possible to specify whether an access request to the connection memory is destructive or non destructive, or with other words whether the data to be accessed is to be erased or not after the access operation. This functionality is provided by mapping the connection memory address space into two distinct address spaces, one for normal access and one for destructive access operations. For example, performing a write access in either address space has the identical effect as far as reading the data out is concerned. However a read access to the second "destructive" address space results in the automatic clearing of the corresponding data immediately after it is read.

Since the transfer of connection data from the DMA to the RAM can be done in parallel to the resetting of the corresponding memory location of the connection memory due to the decoupling of the busses, the invention results in about a factor of two reduction in the system band width required for maintenance of the connection memory. Additionally, it is guaranteed that each connection memory data will always be cleared during the same maintenance slot in which it was read if there is such a requirement, and relieves the microprocessor of the line card of this responsibility.

BRIEF DESCRIPTION OF THE DRAWING

The invention will be better understood, and other characteristics will appear, from the following description, made with reference to the appended drawings, wherein.

DETAILED DESCRIPTION OF A PREFERRED EMBODIMENT

Figure 1:
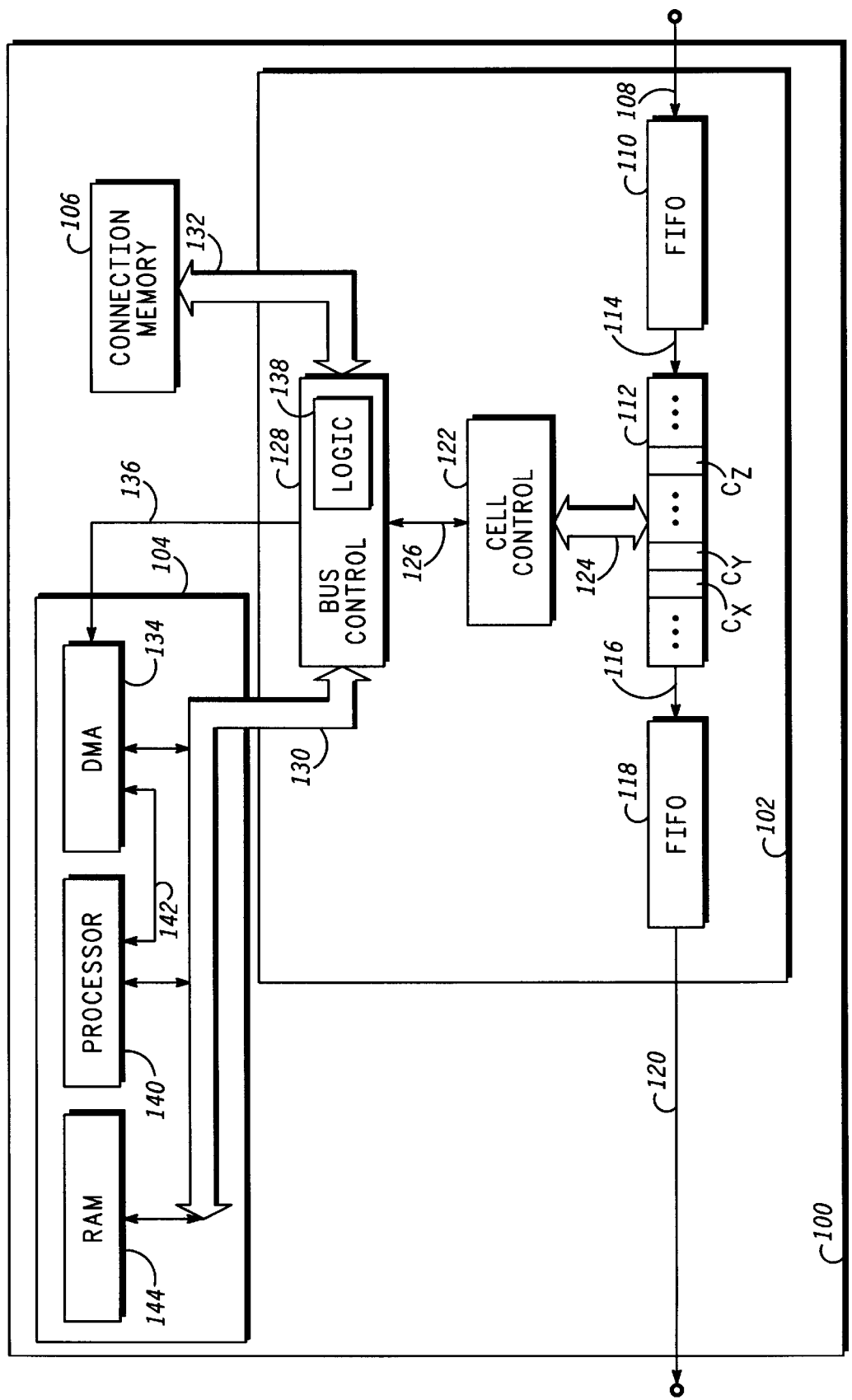
FIG. 1 is a functional diagram of the line card according to the invention.

The ATM line card 100 shown in FIG. 1 comprises a cell processor 102, microprocessor system 104 and connection memory 106. The cell processor 102 receives at its input 108 a continuos flow of ATM cells. These ATM cells can originate from different physical and virtual connections established via a vast plurality of physical lines.

The input cell flow is buffered in FIFO 110 of the cell processor 102. From the FIFO 110 the cells are outputted into the transfer layer 112 via the connection 114. By way of example only three cells $C_x$, $C_y$ and $C_z$ in the transfer layer 112 of the cell processor 102 are shown by way of example. The transfer layer 112 is coupled via connection 116 to FIFO 118 which serves to buffer the output of the cell processor 102. Cells are outputted from the FIFO 118 on the output 120 which is a physical line. On this physical line the cell processor 102 can establish a large number of virtual connections.

The cell processor 102 further comprises a cell controller 122 which is a logic circuitry to control the operation of the transfer layer 112. The cell controller 122 is connected to the transfer layer 112 by control signal bus 124 to control the establishment of virtual connections on the output 120. The cell controller 122 is coupled to bus controller 128 of the cell processor 102 by signal line 126. The bus controller 128 is coupled to microprocessor bus 130 and memory bus 132. The bus controller 128 is also coupled to DMA 134 via the signal line 136. The DMA 134 belongs to the microprocessor system 104. The bus controller 128 further comprises address logic 138 to perform access operations to the connection memory 106.

The microprocessor system 104 has a microprocessor 140 which is coupled via signal line 142 to the DMA 134. The microprocessor 140 as well as the DMA 134 and RAM 144 of the microprocessor system 104 are coupled to the same microprocessor bus 130.

When the line card 100 is operated cells are received at the input 108. These cells are processed in the transfer layer at a rate which is greater than the rate of reception of new incoming cells on the input 108. Therefore from time to time the FIFO 110 is emptied due to the higher processing rate in the transfer layer 112. Since there is a continuos flow of input cells such an event occurs regularly. If the FIFO 110 is empty this is signaled via the control signal bus 124 to the cell controller 122. The cell controller 122 stops the transfer of cells in the transfer layer 112. Since the flow of input cells continues, these cells are buffered in the FIFO 110 until it is full. The time interval required to fill the empty FIFO 110 with incoming new cells from the input 108 provides a time slot which is used for maintenance purposes:

The occurrence of such a maintenance time slot and the halt of the transfer layer 112 is signaled by the cell controller 122 via signal line 126 to the bus controller 128.

The processor 140 periodically wants to access the connection memory 106 to read out event indications, such as running counts and billing information. Such an access to the connection memory is not possible for the processor 140 as long as cells are transferred in the transfer layer 112. This is due to the fact that the continuous flow of cells in the transfer layer 112 has to be reflected in the connection memory 106 so that the connection memory 106 is private to the cell processor 102 as long as the flow in the transfer layer 112 is not stopped by the cell controller 122. The continuous flow of cells in the transfer layer 112 results in a continues updating of the corresponding event indications in the connection memory 106. Therefore the processor 140 has to wait with its access to the connection memory 106 until a maintenance time slot occurs during which no cells are transferred in the transfer layer 112 and thus no updating of the event indications stored in the connection memory 106 is necessary.

When the processor 140 wants to access the connection memory 106 it puts such an access request on the microprocessor bus 130 which is received in the bus controller 128. Such an access request is enabled by the bus controller 128 when the occurrence of a maintenance time slot is signaled by the cell controller 122 via the signal line 126.

This results in a DMA request of the bus controller 128 via the signal line 136. Subsequently the DMA 134 is granted access to the microprocessor bus 130 by the microprocessor 140 via the signal line 142. Then the microprocessor bus 130 and the memory bus 132 are coupled by the bus controller 128 so that a direct data transfer from the connection memory 106 to the DMA 134 can take place. The DMA 134 accesses the connection memory 106 via the microprocessor bus 130 and the memory bus 132 to carry out the requested read operation of event indications stored in the connection memory 106 for the processor 140. Once the requested data are read and transferred via the coupled busses 130 and 132 the busses 130 and 132 are decoupled again by the bus controller 128 so that the connection memory 106 again is private to the cell processor 102.

The kind of the access request is decoded in the address logic 138. When the access request was due to a normal non destructive read operation of event indications in the connection memory 106 no reset operation of the corresponding memory locations in the connection memory 106 is required. However, if the access operation to the connection memory 106 was due to a destructive read the corresponding memory locations in the connection memory 106 have to be reset. This is accomplished by writing zeros to the corresponding memory locations of connection memory 106 under the control of the address logic 138. In parallel to the writing of zeros to the connection memory 106 via the memory bus 132, the data which is read out from the connection memory 106 to the microprocessor system 104 is transferred simultaneously to the writing of the zeros to the RAM 144 via the microprocessor bus 130.

After the resetting of the connection memory 106 is done by the bus controller 128 normal operation of the transfer layer 112 can resume since the required maintenance work of the connection memory 106 is done. Any further processing of the data which is transferred from the connection memory 106 to the RAM 144 can be done in the microprocessor system 104 independently from the operation of the transfer layer 112 since the microprocessor bus 130 and the memory bus 132 are decoupled again and the connection memory 106 thus is private to the cell processor 102. As a consequence the halt time required for maintenance of the connection memory 106 is dramatically reduced since the actual processing of the data is done in the microprocessor system 104 via the transfer of cells in the transfer layer 112 can already resume.

Also there is no need to carry out the resetting of the connection memory 106 and the transfer of the read out data from the DMA 134 to the RAM 144 sequentially since the busses 130 and 132 are decoupled by the bus controller 128 after the initial transfer of the data from the connection memory to the DMA 134 has taken place. The carrying out of the resetting operation of the connection memory 106 and the transfer of data from the DMA 134 to the RAM 144 results in a dramatic reduction of the time required for maintenance. This increases the cell throughput rate of the entire ATM line card 100 and as a consequence also of the ATM switch which comprises a plurality of the ATM line cards 100 shown in FIG. 1.

Figure 2:
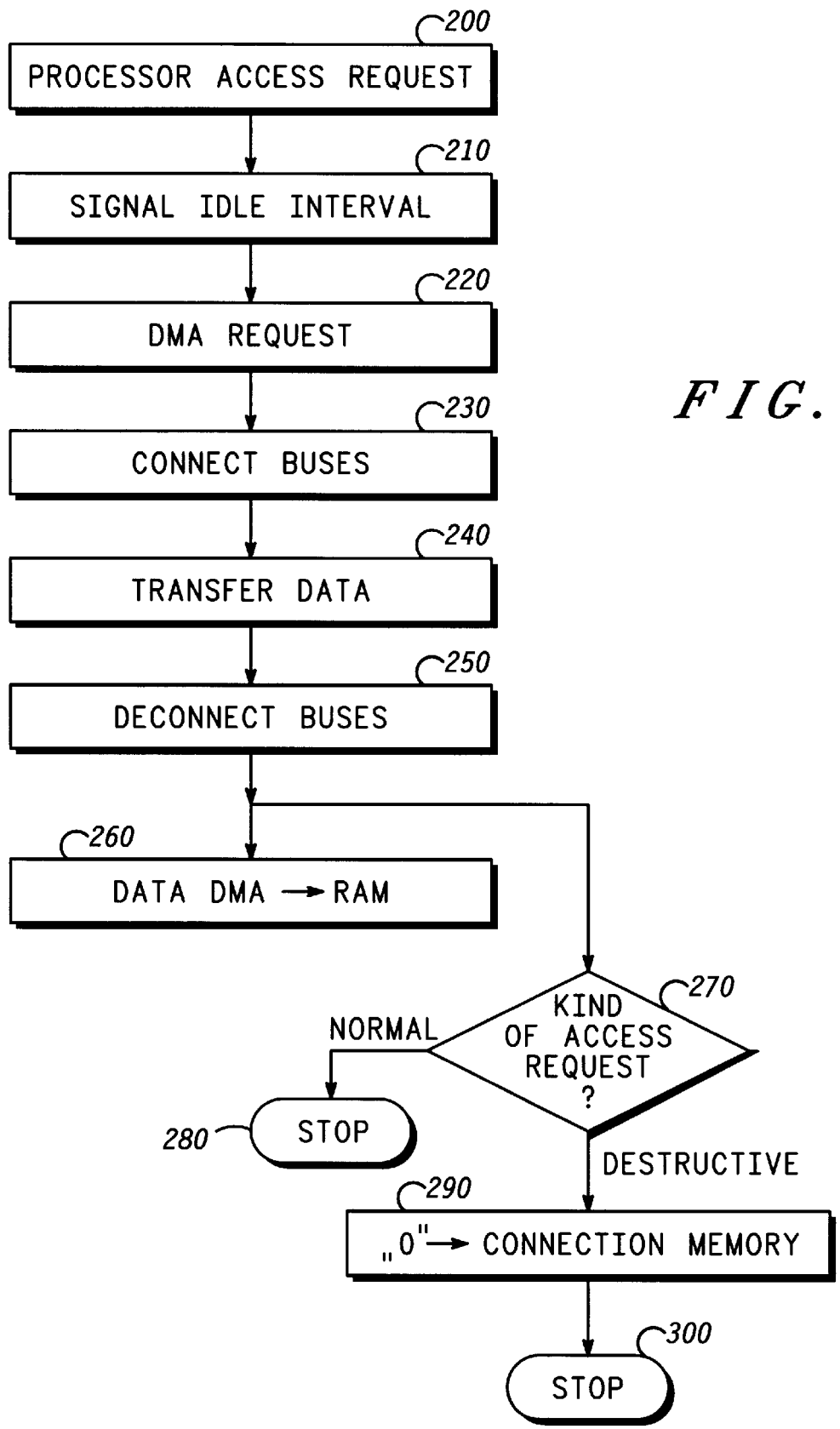
FIG. 2 is a schematic flow chart of the method for transferring data from the connection memory to the RAM.

In the following a preferred embodiment of the method of the invention is explained in greater detail with reference to FIG. 2. In step 200 the processor 140 issues an access request to data, such as event indications, stored in the connection memory 106. The access request of the processor 140 contains information about the kind of access which is required. In the example considered here this is done by mapping the physical address space of the connection memory 106 into two different virtual address spaces. When the address of the access request is in the normal address space this means that the data stored on a memory location corresponding to this first kind of address is only to be read but not to be erased. The same data can be accessed by a different virtual address belonging to the other virtual address space. If an address of the second virtual address space is used this means that the corresponding data not only has to be read but that it has also to be reset after the read operation is accomplished. The decoding of the access address is carried out by the address logic 138.

In step 210 the processor 140 has to wait for an idle interval, i.e. a "hole" in the cell flow, when the transfer of cells in the transfer layer 112 is halted to provide a maintenance time slot. During such a maintenance time slot the cell processor 102 does not effect cell transfers via the virtual connections.

As soon as the cell controller 122 signals the occurrence of such an idle interval in step 210 via signal line 126 the access request of the processor is enabled by the bus controller 128. This results in a DMA request in step 220 which is issued via the signal line 136 to the DMA 134. Subsequently the bus controller 128 connects the microprocessor bus 130 and the memory bus 132 so that the two busses 130 and 132 are coupled for data transfer. In step 240 the data, which the processor 140 wants to access according to its access request of step 200, are transferred from the connection memory 106 to the DMA 134. After the transfer has been accomplished the busses 130 and 132 are deconnected in step 250 by the bus controller 128 so that the busses 130 and 132 are decoupled again.

As a consequence it is possible to transfer the data from DMA 134 to the RAM 144 in step 260 on the microprocessor bus 130 without interaction of the cell processor 102 since the microprocessor bus 130 is private again to the microprocessor system 104.

Step 270 is carried out in parallel to step 260. In step 270 it is decided which is the kind of the access request of the processor 140 which is issued in step 200. This is done by the address logic 138. If an address of the first virtual memory space which is used for normal access requests is encountered then the address logic 138 stops the control flow in step 280 so that the bus controller 128 signals to the cell controller 122 via the signal line 126 that the maintenance processing is done as far as the connection memory 106 is concerned and that the normal operation of the transfer layer 112 therefore can resume.

If the address which is used for the access request is belonging to the destructive address space this means that a sequence of zeros is written to the connection memory 106 in step 290 to the corresponding memory locations in order to reset the event indications, especially running counts or the like. After this is accomplished the control flow stops in step 300 and only now the bus controller 128 signals to the cell controller 122 that normal operation of the transfer layer 112 can resume since the memory bus 132 is available again for the normal system operation.

Although the various aspects of the invention have been described with respect to a preferred embodiment, it will be understood that the invention is entitled to full protection within the full scope of the appended claims.

What is claimed is:

1. An ATM line card comprising
   a) cell processor means for establishing a number of virtual connections;
   b) connection memory means for storage of processing data of said virtual connections, said connection memory means being coupled to said cell processor means via a memory bus means;
   c) microprocessor means being coupled to microprocessor bus means;
   d) said cell processor means comprising control means for selectively coupling said memory bus means to said microprocessor bus means during a time interval when said cell processor does not effect cell transfers via said virtual connections.

2. The ATM line card of claim 1 said control means being adapted to receive an access request to data stored in said connection memory from said processor means, said access request specifying whether said data to be accessed is to be erased or not, whereby said control means decouples said memory bus means and said microprocessor bus means after said access is accomplished and subsequently erases said data via said memory bus.

3. The ATM line card of claim 2 said ATM line card further comprising random access memory means and direct memory access means; said random access memory means and said direct memory access means being coupled to said microprocessor bus means,
   said control means being adapted to issue a request to said direct memory access means in response to said access request of said processor means, so that said direct memory access means is granted access to said processor bus.

4. The ATM line card of claim 1 the physical address space of said connection memory means being mapped by said control means into a first address space for normal access requests and a second address space for access requests in response to which said data is to be erased.

5. An ATM switch comprising a plurality of ATM line cards according to claim 1.

6. A method for selectively coupling a microprocessor system to connection memory means, said connection memory means being adapted to store processing data of virtual connections established by ATM cell processor means, said method comprising the steps of:
   a) buffering of input cells for said cell processor means;
   b) processing said cells in said cell processor means at a rate which higher than a line rate;
   c) coupling memory bus means of said connection memory means to microprocessor bus means of said microprocessor system during a time interval when said cell processor does not effect cell transfers via said virtual connections.

7. A method for transferring data from connection memory means to random access memory means, said connection memory means being adapted to store processing data of virtual connections established by means of an ATM line card, said method comprising the steps of:
   a) issuing an access request to data stored in said connection memory means, said access request specifying whether said data to be accesses is to be erased or not;
   b) coupling memory bus means of said connection memory means to microprocessor bus means of an microprocessor system comprising said random access memory means during a time interval when said cell processor does not effect cell transfers via said virtual connections;
   c) transferring said data via said coupled memory bus means and microprocessor bus means;
   d) decoupling said coupled memory bus means and microprocessor bus means;
   e) in case that said access request specifies that said accessed data is to be erased: Erasing said accessed data in said connection memory means.

8. The method of claim 7 whereby simultaneously to said step of erasing said accessed data said accessed data is transferred from direct memory access means of said microprocessor system to said random access memory means.

* * * * *